(12) United States Patent
Malshe

(10) Patent No.: US 12,351,891 B2
(45) Date of Patent: Jul. 8, 2025

(54) EFFECTIVE UTILIZATION OF JAROSITE WASTE

(71) Applicant: Vinod Chintamani Malshe, Mumbai (IN)

(72) Inventor: Vinod Chintamani Malshe, Mumbai (IN)

(*) Notice: Subject to any disclaimer, the term of this patent is extended or adjusted under 35 U.S.C. 154(b) by 820 days.

(21) Appl. No.: 17/496,918

(22) Filed: Oct. 8, 2021

(65) Prior Publication Data

US 2022/0025482 A1 Jan. 27, 2022

Related U.S. Application Data

(63) Continuation of application No. PCT/IN2020/050388, filed on Apr. 28, 2020.

(30) Foreign Application Priority Data

May 1, 2019 (IN) .............................. 201921017290

(51) Int. Cl.
*C22B 3/22* (2006.01)
*C22B 7/00* (2006.01)

(52) U.S. Cl.
CPC .............. *C22B 7/007* (2013.01); *C22B 7/008* (2013.01)

(58) Field of Classification Search
CPC .... C22B 3/22; C22B 3/44; C22B 3/46; C22B 7/007; C22B 7/008; Y02P 10/20
See application file for complete search history.

(56) References Cited

U.S. PATENT DOCUMENTS

| | | | |
|---|---|---|---|
| 4,366,127 A | 12/1982 | Rastas et al. | |
| 5,078,786 A | 1/1992 | Peters et al. | |
| 5,453,253 A | 9/1995 | Von Ropenack et al. | |
| 5,538,532 A * | 7/1996 | Keegel, Jr. .............. | C22B 19/30 75/10.63 |
| 5,624,650 A | 4/1997 | McEwan et al. | |
| 2016/0258038 A1* | 9/2016 | Hourn ..................... | C22B 34/22 |

FOREIGN PATENT DOCUMENTS

| | | |
|---|---|---|
| EP | 0428194 | 5/1991 |
| WO | 2018/109283 | 6/2018 |

OTHER PUBLICATIONS

WIPO, International Search Report in corresponding PCT application PCT/IN2020/050388, Aug. 21, 2020.
WIPO, Written Opinion of the ISA in corresponding PCT application PCT/IN2020/050388, Aug. 21, 2020.
Raghavan et al., Innovative processing technique to produce zinc concentrate from zinc leach residue with simultaneous recovery of lead and silver, Hydrometallurgy, 1998.

\* cited by examiner

*Primary Examiner* — Jie Yang
(74) *Attorney, Agent, or Firm* — Alley IP

(57) ABSTRACT

A method for recovery of metals from Jarosite waste for its effective utilization wherein, the treatment of nitric acid to jarosite waste extracts the nitrates of lead, cadmium, iron, copper, nickel, zinc, aluminum, manganese, cobalt, magnesium and calcium in the filtrate; the treatment of sulfuric acid to the residue obtained from step (a) extracts the metal in the form of ferrous sulfate, aluminum sulfate, zinc sulfate and calcium sulfate in the filtrate; and the treatment of alkali to the residue obtained from step (a) extracts the metal in the form of sodium silicate and sodium aluminate in the filtrate. The silver present in the Jarosite waste as sulfate/silicate is not extracted in nitric acid, sulfuric acid or alkali. Thus, the remaining residue is enriched with silver concentration to at least 2000 ppm, where silver can be easily recoverable and has good commercial value.

13 Claims, No Drawings

EFFECTIVE UTILIZATION OF JAROSITE WASTE

RELATED APPLICATIONS

This application claims priority under 35 U.S.C. § 120 to, and is a continuation of, co-pending International Application PCT/IN2020/050388, filed Apr. 28, 2020 and designating the US, which claims priority to Indian Application 201921017290, filed May 1, 2019, such Indian Application also being claimed priority to under 35 U.S.C. § 119. These Indian and International applications are incorporated by reference herein in their entireties.

FIELD

The present invention relates in general to an effective utilization of Jarosite which is a solid waste generated during the hydrometallurgical leaching of concentrates in lead-zinc smelter. Particularly, the present invention relates to the recovery of valuable metals from Jarosite without leaving any residual waste of it at the end. The present invention recovers and recycles the chemicals used in the recovery of valuable metals from Jarosite without losing their chemical value.

BACKGROUND

Zinc is found in nature as lean zinc sulfide along with several other metals such as iron, copper, aluminum, lead, calcium, potassium, cadmium and silica. There are traces of silver to the tune of 5 to 100 ppm. The sulfide ore is concentrated by froth flotation to about 50-55% zinc sulfide. Other components make up the rest.

In the first step of the process, the ore is roasted at 900-950° C. to convert all sulfides into oxides. The emerging gases rich in sulfur dioxide are cooled, purified to remove dust and mercury. The gas mixture is then sent to oxidation reactor to convert SO2 to SO3 which is then absorbed in water or dilute sulfuric acid to manufacture sulfuric acid.

The roasted zinc sulfide, which is primarily a metal oxide is leached with dilute sulfuric acid to dissolve most of the zinc by careful selection of temperature and pH to more selectively dissolve sulfates of zinc, copper, cadmium and a small amount of calcium. The sulfates of lead, silver, calcium, magnesium, trivalent oxide of iron, aluminum and silica remain insoluble and thus are rejected as a part of Jarosite. The zinc sulfate rich solution is treated with metallic zinc to galvanically precipitate the metals like copper, nickel, cobalt and cadmium which have lower reduction potential than zinc. The concentrated zinc sulfate is allowed to sediment to discard any insoluble sulfates of calcium and lead, and then taken to electrolytic cells to reduce the zinc to elemental state. It is then melted and converted to ingots of specific weight. Copper, cadmium and other metals precipitated are treated for recovery of individual elements by process of distillation or other chemical methods. It is not possible to recover entire quantity of zinc from the insolubles and hence this is rejected along with other insoluble materials. This insoluble material is termed as Jarosite and forms the major effluent of the process. Over a period of time, millions of tons of this waste accumulate along the manufacturing sites. India manufactures about 7.9 lakh tons of zinc metal at one site (Chandaria in Rajasthan). It produces about 500 tons of residues from leaching which poses environmental hazard. The plant is operating for last 20 years and has stocked up about 8 million tons of the waste in a solidified form.

There have been several efforts to "dispose" off this waste. Several agencies employed for safe disposal have studied the composition in detail and have recommended methods of safe disposal of this material. Most recommendations from reputed institutions including ITT Chennai, NEERI Nagpur includes the use of Jarosite in cement manufacturing or direct addition to last stage of cement manufacturing along with mineral gypsum. Journal of Hazardous Materials, Volume 137, Issue 3, 11 Oct. 2006, Pages 1589-1599 titled "Hazardous jarosite use in developing non-hazardous product for engineering application" discloses recycling the hazardous jarosite released from zinc industries in developing non-hazardous products which can ultimately be used in building applications.

Other environmental studies have recommended to safely dump it underground and capping it. (Proceedings of Indian geotechnical conference 15-17-2011, Kochi (Paper No. L-306)).

In several locations of Hindustan Zinc, it is stocked over ground taking care of prevention of leachate from entering the ground water due to potential contamination with zinc, lead and other harmful elements. (hzlindia.com/sustainability/environment-management/waste management/)

Presently Jarosite is treated with lime and cement to minimize leaching of heavy metals and the treated waste is called "Jarofix". Jarofix is stocked in high density polyethylene (HDPE) lined disposal yards. The utilization of Jarofix is explored as a sub-grade and embankment material for road making during widening of State Highway near Chittorgarh (Rajasthan). However, the annual production of Jarofix is about 5 lakh metric tons per year while the unutilized accumulated Jarofix is about 15 lakh metric tons at Hindustan Zinc Limited, Chittorgarh, Rajasthan [Sinha, A. K., et al. "Characterization of Jarofix waste material for the construction of road." (2013) and Sinha, A. K., et al. "Design, Construction & Evaluation of Jarofix Embankment and Sub Grade Layers." (2012).]. The material is occupying costly agricultural lands and has become an environmental hazard. Contamination of heavy metals in the environment is of major concern because of their toxicity and threat to human life and environment (Er. Nitisha Rathore et al., IJCIET, Volume 5, Issue 11, November (2014), pp. 192-200).

Detailed analysis of the elements present in Jarosite has been attempted by several investigators. One of the publications titled "Analysing the characteristics and application potentials of Jarosite waste in KOSOVO" in Global NEST Journal, Vol. 18, No. 1, pp 89-97, 2016 by Kerolli-Mustafa M. and Ćurković L. illustrates typical analysis of Jarosite as follows:

TABLE 1

A typical analysis of Jarosite

| Element | mean ± σ |
|---|---|
| $Al_2O_3$, wt. % | 1.44 ± 0.02 |
| $Fe_2O_3$, wt. % | 44.82 ± 0.04 |
| $SiO_2$, wt. % | 6.29 ± 0.6 |
| Zn, wt. % | 10.15 ± 0.02 |
| Pb, wt. % | 7.5 ± 0.14 |
| Cu, wt. % | 0.93 ± 0.01 |
| Ag, mg $kg^{-1}$ | 132.52 ± 11.72 |
| Ba, mg $kg^{-1}$ | 566.70 ± 183.53 |

TABLE 1-continued

A typical analysis of Jarosite

| Element | mean ± σ |
|---|---|
| Co, mg kg$^{-1}$ | 28.28 ± 0.25 |
| Cd, mg kg$^{-1}$ | 2203.69 ± 22.27 |
| Cr, mg kg$^{-1}$ | 406.39 ± 12.25 |
| Mn, mg kg$^{-1}$ | 6283.74 ± 74.05 |
| Ni, mg kg$^{-1}$ | 91.40 ± 1.06 |
| Sr, mg kg$^{-1}$ | 136.10 ± 1.01 |
| As, mg kg$^{-1}$ | 5025.33 ± 4.42 |
| S, wt. % | 6.55 ± 0.02 |
| C, wt. % | 0.56 ± 0.01 |
| H, wt. % | 0.77 ± 0.01 |
| N, wt. % | 0.48 ± 0.02 |
| P, wt. % | 0.0073 ± 0.01 |

As can be seen, a significant quantity of zinc remains unextracted and it has become an environmental threat and a huge disposal problem. The world production of zinc is about 15 million tons/year. Each ton produces about 0.16 tons of Jarosite waste. This represents a significant loss of valuable metals like Zinc, Lead and Silver.

All studies reported so far and the practices followed by the manufacturers all over the world are following methods which suitably "dispose" the waste safely.

There have been no attempts made in the existing art till date to recover silver, lead, cadmium, copper, nickel, zinc, manganese and cobalt which have commercial value and importance. Thus, there is a need to provide a method for effective utilization of Jarosite based on the recovery of metals among commercially important metals like silver, lead, cadmium, copper, nickel, zinc, manganese and cobalt.

SUMMARY

It is the primary object of the invention to eliminate the disposal of Jarosite waste and its associated problems.

It is the object of the invention to develop a method to recover metals amongst commercially important metals like silver, lead, cadmium, copper, nickel, manganese and cobalt from Jarosite waste; thereby leading to its effective utilization.

It is another object of the invention to develop the method to recover silver by increasing the concentration of silver to at least 2000 ppm in an insoluble residue.

It is another object of the invention to develop the method to recover zinc nitrate, zinc sulfate, calcium ammonium nitrate, magnesium nitrate and ammonium nitrate to be used as a fertilizer; thereby leading to its effective utilization.

It is still another object of the invention to develop a method to recover every valuable element to the fullest thus minimizing the waste material.

It is still another object of the invention to develop a method to retain value of every chemical like nitric acid, ammonia, sulfuric acid to the fullest used in the recovery process, thus minimizing the cost of recovery and reduction in waste material In the present invention, the treatment of nitric acid extracts metals in the form of lead nitrate, cadmium nitrate, iron nitrate, copper nitrate, manganese nitrate, nickel nitrate, zinc nitrate, aluminum nitrate and calcium nitrate in the filtrate; the treatment of sulfuric acid extracts the metal in the form of sulfates of iron, alumina, zinc, manganese and nickel in the filtrate; and the treatment with alkali extracts the metal in the form of sodium silicates and sodium aluminates in the filtrate. It is surprising to note that the silver present in the Jarosite waste as sulfate or silicate is not extracted in nitric acid as well as sulfuric acid or alkali. Thus, silver is found as a part of insoluble residue. By giving treatment of nitric acid and sulfuric acid or alkali, most metals in the form of mixed oxides, sulfates, nitrates, etc. are extracted from the Jarosite waste and the remaining insoluble residue is enriched of silver concentration. It was found that the concentration of silver in the insoluble residue so obtained in the invention is of at least 2000 ppm. At this concentration level, silver can be easily recoverable and thus the residue has good commercial value.

According to the invention, there is provided a method for recovery of metals from Jarosite waste for its effective utilization wherein, the method comprises treating the Jarosite waste with nitric acid in a grinding machine further filtering it to obtain a filtrate consisting of lead nitrate, cadmium nitrate, iron nitrate, copper nitrate, nickel nitrate, zinc nitrate, aluminum nitrate, manganese nitrate, cobalt nitrate, magnesium nitrate and calcium nitrate and an insoluble residue consisting of sulfates of lead, cadmium and silver, ferric oxide, oxides of silicon, oxides of arsenic and compounds of iron, zinc, calcium, aluminum and silica;

treating the residue obtained in step (a) with sulfuric acid in the presence of a reducing agent followed by filtration to obtain an acid insoluble residue consisting of compounds of silica, iron and zinc and sulfates of lead, cadmium, calcium and silver and a filtrate consisting of ferrous sulfate, aluminum sulfate, zinc sulfate and calcium sulfate;

combining the filtrate obtained from steps (a) and (b) followed by adding ammonia to the filtrate followed by filtration to obtain an insoluble residue consisting of iron hydroxide, aluminum hydroxide, lead sulfate, cadmium sulfate and calcium sulfate and a filtrate consisting of sulfates or nitrates of zinc, copper, calcium, magnesium, manganese, cobalt and nickel;

reducing the residue obtained in step (c) at 800-1100° C. under reducing atmosphere to produce an elemental lead and cadmium;

adding elemental zinc metal powder to the filtrate from step (c) to galvanically displace metals followed by filtration to recover elemental copper, manganese, cobalt and nickel and a residual solution followed by analyzing the residual solution for the absence of copper, manganese, cobalt and nickel; and concentrating the residual solution obtained in step (e) to obtain a mixture of zinc nitrate, zinc sulfate, calcium ammonium nitrate, magnesium nitrate, and ammonium nitrate to be used as fertilizer.

The step (a) is carried out by mixing the Jarosite waste with 69% nitric acid in 1:1.5 to 2 proportion followed by grinding 20% wt./wt. of the mixture in the presence of 80% wt./wt. ZrO$_2$ beads for at least 2.5 minutes and filtering the mixture by using filter paper under vacuum to obtain the filtrate consisting of lead nitrate, cadmium nitrate, iron nitrate, copper nitrate, nickel nitrate, zinc nitrate, aluminum nitrate, manganese nitrate, cobalt nitrate, magnesium nitrate and calcium nitrate and the insoluble residue consisting of sulfates of lead, cadmium and silver, ferric oxide, oxides of silicon, oxides of arsenic and compounds of iron, zinc, calcium, aluminum and silica.

Typically, the Jarosite waste is mixed with 69% nitric acid in 1:1.6 proportion in step (a).

Typically, step (a) is repeated at least thrice.

Typically, the filtrate obtained from step (a) is optionally treated with ammonium sulfate to precipitate lead nitrate and cadmium nitrate as lead sulfate and cadmium sulfate respectively followed by filtration to obtain lead sulfate and cadmium sulfate. The lead sulfate and cadmium sulfate so obtained is used for recovery of lead and cadmium.

Typically, the amount of ammonium nitrate added to the filtrate is equal to the amount of lead and cadmium nitrates present in the filtrate obtained in step (a).

The step (b) is carried out by treating the residue obtained from step (a) with 98% of sulfuric acid in 0.9:1 proportion in the presence of 20% wt./wt. of the reducing agent by stirring followed by filtration to obtain the acid insoluble residue comprising compounds of silica, iron, zinc and lead and sulfates of lead, cadmium, calcium and silver; and the filtrate comprising ferrous sulfate, aluminum sulfate, zinc sulfate and calcium sulfate.

Typically, the reducing agent used in step (b) is selected from iron scrap, hydrazine hydrate, sulfur dioxide or sodium meta-bi-sulfite. Sulfur dioxide is obtained as a by-product during roasting of zinc ore which may be isolated and used in step (b).

Typically, the step (b) is carried out at temperature in the range of 50 to 60° C.

Typically, the step (c) is carried out by combining the filtrate obtained from steps (a) and (b) followed by adding ammonia to the combined filtrate to adjust the pH of the filtrate to 8 followed by filtration to obtain the residue consisting of iron hydroxide, aluminum hydroxide, lead sulfate, cadmium sulfate and calcium sulfate and the filtrate consisting of sulfates or nitrates of zinc, copper, calcium, magnesium, manganese, cobalt and nickel.

Typically, the step (d) is carried out by reducing the residue obtained from step (c) in the presence of gaseous reducing agents such as carbon monoxide and hydrogen at 800-1100° C. to produce the elemental lead and cadmium.

Typically, the step (e) of metal displacement particularly galvanic displacement is carried out by analyzing the concentration of copper, manganese, cobalt and nickel in the filtrate obtained from step (c), adding 200% of stoichiometric excess concentration of the elemental zinc metal based on total combined metals of copper, manganese, cobalt and nickel to the filtrate followed by stirring to displace metals like copper, manganese, cobalt and nickel by galvanic displacement followed by filtration to obtain the metals like copper, manganese, cobalt and nickel and the residual solution consisting of nitrates or sulfates of zinc, calcium and magnesium.

Typically, the step (f) is carried out by concentrating the residual solution of step (e) by heating at 50° C. to 100° C. to obtain the mixture of zinc nitrate, zinc sulfate, calcium ammonium nitrate, magnesium nitrate and ammonium nitrate.

Typically, the mixture of zinc nitrate, zinc sulfate, calcium ammonium nitrate, magnesium nitrate and ammonium nitrate can be used as fertilizer.

The step (b) is optionally carried out by treating the residue obtained from step (a) with alkali at 120° C. to 180° C. under autogenous pressure followed by cooling and filtration to obtain a residue comprising insoluble sulfates of lead, cadmium and silver, and compounds of iron, alumina, zinc, and silica and a filtrate comprising sodium silicate, sodium aluminate and un-reacted alkali.

The filtrate is subjected to crystallization by adding seeds of zeolite clay to crystallize alumino silicates followed by filtration to obtain crystals of alumino silicates and a filtrate comprising alkali.

Typically, the alkali is selected from sodium hydroxide and potassium hydroxide.

The filtrate so obtained upon crystallization of alumino silicates mainly comprises un-reacted alkali and alkali formed due to crystallization which is recycled in the next batch of step (b) of alkali treatment.

The residue obtained at the end of step (b) has a concentration of silver of at least 2000 ppm.

The residue obtained at the end of step (b) has a concentration of silver in the range of 2000 ppm to 3000 ppm (maximum) depending on the initial concentration of silver in Jarosite.

Typically, the residue obtained in any steps of the method of the present invention is subjected to XRF analysis method and the filtrate by material balance method to analyze their respective composition.

The present invention recovers every valuable element to the fullest thus utilizing the Jarosite waste effectively. The invention also recovers every resource that is added to the recovery process to its full value.

The present invention also intends to cover the method for recovery of metals from Jarofix waste for its effective utilization as a part of its scope. The method will remain the same except there will be additional chemicals required for destroying the cement which is primarily calcium silicate and calcium alumino ferrite.

DETAILED DESCRIPTION

The terms "a," "an," "the" and similar referents used in the context of describing the invention following claims are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illustrate the invention and does not pose a limitation on the scope of the invention otherwise claimed. No language in the specification should be construed as indicating any non-claimed element essential to the practice of the invention.

Certain embodiments of this invention are described herein, including the best mode known to the inventors for carrying out the invention. Of course, variations on these described embodiments will become apparent to those of ordinary skill in the art upon reading the description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the below-described elements in all possible variations thereof is encompassed by the invention unless otherwise indicated herein or otherwise clearly contradicted by context.

Specific embodiments disclosed herein can be further limited in the claims using consisting of or and consisting essentially of language. When used in the claims, whether as filed or added per amendment, the transition term "consisting of excludes any element, step, or ingredient not specified in the claims. The transition term "consisting essentially of limits the scope of a claim to the specified materials or steps and those that do not materially affect the basic and novel characteristic(s). Embodiments of the invention so claimed are inherently or expressly described and enabled herein.

According to the elemental analysis, most of the elements present in Jarosite/Jarofix wastes are basic in nature except silica and arsenic.

In one of the embodiments of the invention, the Jarosite waste is treated with nitric acid in a grinding machine to dissolve most metal oxides in it. The residue is treated repeatedly in a grinding machine to remove the insoluble deposits of silica and arsenic from the particle surface till most of the metals dissolve in nitric acid. The dispersion is filtered, the residue is washed with de-ionized water to make it free of any soluble materials. The filtrate is reserved for further treatment. The residue primarily consists of sulfates of lead, cadmium and silver, ferric oxide, oxides of silicon, oxides of arsenic and compounds of iron, zinc, calcium, aluminum and silica.

According to the invention there is provided a method for recovery of metals from Jarosite waste for its effective utilization wherein, the method comprises Jarosite waste is treated with nitric acid in a grinding machine followed by filtration to obtain a filtrate consisting of lead nitrate, cadmium nitrate, iron nitrate, copper nitrate, nickel nitrate, zinc nitrate, aluminum nitrate, manganese nitrate, cobalt nitrate, magnesium nitrate and calcium nitrate and an insoluble residue consisting of sulfates of lead, cadmium and silver, ferric oxide, oxides of silicon, oxides of arsenic and compounds of iron, zinc, calcium, aluminum and silica;

The residue obtained from step (a) is treated with sulfuric acid in the presence of a reducing agent followed by filtration to obtain an acid insoluble residue consisting of compounds of silica, iron and zinc and sulfates of lead, cadmium, calcium and silver and a filtrate consisting of ferrous sulfate, aluminum sulfate, zinc sulfate and calcium sulfate;

The filtrate obtained in step (a) is combined with the filtrate obtained from step (b) followed by addition of ammonia to the combined filtrate followed by filtration to obtain an insoluble residue consisting of iron hydroxide, aluminum hydroxide, lead sulfate, cadmium sulfate and calcium sulfate and a filtrate consisting of sulfates or nitrates of zinc, copper, calcium, magnesium, manganese, cobalt and nickel;

The residue obtained from step (c) is reduced at 800-1100° C. under reducing atmosphere to produce an elemental lead and cadmium;

An elemental zinc metal powder is added to the filtrate obtained from step (c) to galvanically displace metals followed by filtration to recover elemental copper, manganese, cobalt and nickel and a residual solution followed by analyzing the residual solution for the absence of copper, manganese, cobalt and nickel; and The residual solution obtained from step (e) is concentrated to obtain a mixture of zinc nitrate, zinc sulfate, calcium ammonium nitrate, magnesium nitrate and ammonium nitrate.

The residue obtained in any steps of the method of the present invention is subjected to XRF Analysis Method and the filtrate by material balance method to analyze their respective composition.

The step (a) is carried out by mixing the Jarosite waste with 69% nitric acid in 1:1.5 to 2 proportion followed by grinding 20% wt./wt. of the mixture in the presence of 80% wt./wt. $ZrO_2$ beads for at least 2.5 minutes. The mixture is filtered by using filter paper under vacuum to obtain the filtrate consisting of lead nitrate, cadmium nitrate, iron nitrate, copper nitrate, nickel nitrate, zinc nitrate, aluminum nitrate, manganese nitrate, cobalt nitrate, magnesium nitrate and calcium nitrate and the insoluble residue consisting of sulfates of lead, cadmium and silver, ferric oxide, oxides of silicon, oxides of arsenic and compounds of iron, zinc, calcium, aluminum and silica.

The proportion of Jarosite to nitric acid and the quantity of $ZrO_2$ beads is critical to achieve dissolution of most of the metals in the aqueous nitric acid.

$ZrO_2$ beads increases the extraction of metals including zinc, lead, aluminum, copper, cadmium, iron, manganese, cobalt, nickel, magnesium, calcium, etc. into the aqueous nitric acid.

The Jarosite waste is mixed with 69% nitric acid in 1:1.6 proportion in step (a).

The grinding of step (a) is carried out for 2.5 to 15 minutes.

The step (a) is repeated at least thrice.

The residue obtained in the step (a) is washed with water and the washings so obtained are combined with the filtrate.

The filtrate obtained from step (a) is optionally treated with ammonium sulfate to precipitate lead nitrate and cadmium nitrate as lead sulfate and cadmium sulfate respectively followed by filtration to obtain lead sulfate and cadmium sulfate. The lead sulfate and cadmium sulfate so obtained is used for recovery of lead and cadmium.

The amount of ammonium sulfate added to the filtrate is equal to the amount of lead and cadmium nitrate present in the filtrate obtained from step (a).

In the present method, the step (a) can be carried out in multiple dispersion mills. Nitric acid is used in counter current mode in the step (a). If the number of dispersion mills used in the present inventions is three, then fresh nitric acid is added to the third mill; used nitric acid of third mill is added to the second mill and used acid from second mill is added to the first mill to improve the efficiency of extraction and reduce the requirement of nitric acid in step (a). Thus, if there are 'n' number of dispersion mills, then fresh nitric acid is added to the nth mill, used nitric acid of nth mill is added to the (n-1)th mill and so on. Therefore, the current mode will also reduce quantity of ammonia used in the step (c).

250 gm of Jarosite is leading to 50 gm of insoluble residue and 2600 ml filtrate at the end of the step (a) i.e. after wash.

The step (b) is carried out by treating the residue obtained from step (a) with 98% of sulfuric acid in 0.9:1 proportion in the presence of 20% wt./wt. of the reducing agent by stirring for at least 60 minutes followed by filtration to obtain the acid insoluble residue comprising compounds of silica, iron and zinc and sulfates of lead, cadmium, calcium and silver; and the filtrate comprising ferrous sulfate, aluminum sulfate, zinc sulfate and calcium sulfate.

The reducing agent used in step (b) is selected from iron scrap, hydrazine hydrate, sulfur dioxide or sodium meta-bisulfite. Sulfur dioxide is obtained as a by-product during roasting of zinc ore which may be isolated and used in step (b).

The step (b) is exothermic and is carried out at temperature in the range of 50 to 60° C.

The scrap iron metal reduces the ferric form of iron oxide to ferrous form that helps it to dissolve in sulfuric acid.

The acid insoluble residue obtained at the end of the step (b) is 36.6 gm and the filtrate combined with washings obtained in step (b) is 500 ml.

The residue obtained at the end of the step (b) has 6.8 fold increase in concentration of silver. The residue so obtained at the end of step (b) has a concentration of silver of at least 2000 ppm. The silver at this concentration level is recoverable and hence to achieve this concentration level is very important from commercial point of view.

The filtrate obtained in step (b) is mixed with the filtrate obtained from step (a) in step (c) and processed further. The combining of the filtrate obtained from steps (a) and (b) is essential to precipitate heavy metals lead and cadmium sulfate as the same is not desirable in the next step.

In step (c), ammonia is added to the combined filtrate to adjust the pH of the filtrate to 8 to precipitate iron and aluminum simultaneously as hydroxides. The precipitated residue obtained after filtration consists of iron hydroxide, aluminum hydroxide, lead sulfate, cadmium sulfate and calcium sulfate. The filtrate consists of sulfates or nitrates of zinc, copper, calcium, magnesium, manganese, cobalt and nickel which are soluble at this stage. The filtrate is reserved for further treatment. The precipitate residue is further washed with water to recover all of zinc, copper, calcium, magnesium, manganese, cobalt and nickel. The washings are combined with the filtrate of step (c) and processed further in the step (e).

The step (d) is carried out by reducing the residue obtained from step (c) in the presence of gaseous reducing agents such as carbon monoxide and hydrogen at 800-1100° C. for 60 to 90 minutes to produce the elemental lead and cadmium.

In step (e), the filtrate obtained from step (c) is analyzed for the concentration of copper, manganese, cobalt and nickel by atomic absorption and it is found that the filtrate comprises 0.038 mole of combined copper, manganese, cobalt and nickel. Based on the molar concentration of copper, cobalt and nickel, 200% of stoichiometric excess concentration of the elemental zinc metal based on total combined metals of copper, manganese, cobalt and nickel is added to the filtrate of step (c). Particularly, 10 gm of zinc powder is added to the filtrate comprising 0.038 mole of combined copper, cobalt and nickel. The mixture is stirred to displace elemental copper, manganese, cobalt and nickel followed by filtration to obtain the metals such as copper, manganese, cobalt and nickel and the residual solution. Step (e) is conventionally carried out in the zinc manufacturing plant. The chemical reactions involved here are as follows:

$$Cu^{++}+Zn^\circ \rightarrow Cu^\circ+Zn^{++}$$

$$Ni^{++}+Zn^\circ \rightarrow Ni^\circ+Zn^{++}$$

$$Co^{++}+Zn^\circ \rightarrow Co^\circ+Zn^{++}$$

$$Mn^{++}+Zn^\circ \rightarrow Mn^\circ+Zn^{++}$$

After recovery of elemental copper, cobalt and nickel, the residual solution is analyzed and found to be free of the elements of copper, cobalt and nickel. Silver is also absent in the residual solution. The analysis is carried out by atomic absorption.

Typically, the residual solution remaining at the end of step (e) consists of nitrates or sulfates of zinc, calcium and magnesium as they are soluble in aqueous medium.

In step (f), the residual solution obtained from step (e) is concentrated by heating (i.e. evaporation) at 50° C. to 100° C. to yield a mixture of zinc nitrate, zinc sulfate, calcium ammonium nitrate, magnesium nitrate and ammonium nitrate. This mixture can be used as fertilizer. This mixture is also enriched with zinc and the same can be used as a micronutrient. This mixture is useful as the world requirement of zinc as a micro nutrient is of the order of a few million tons.

It is also possible to recover zinc from the residual solution of step (e) by electrolysis.

Typically, in the method according to the present invention, the step (b) is optionally carried out by treating the residue obtained from step (a) with alkali at 120° C. to 180° C. under autogenous pressure followed by cooling and filtration to obtain the residue comprising insoluble sulfates of lead, cadmium and silver, and compounds of iron, alumina, zinc and silica and the filtrate comprises sodium silicate, sodium aluminate and un-reacted alkali.

Typically, the alkali is selected from sodium hydroxide, potassium hydroxide, etc.

Typically, the alkali treatment is carried out at 140 to 180° C.

The filtrate is subjected to crystallization by adding seeds of zeolite clay to crystallize alumino silicates followed by filtration to obtain crystals of alumino silicates and a filtrate comprising alkali. The recovered filtrate comprising un-reacted alkali and alkali formed due to crystallization is recycled in the next batch of the invention.

The residue so obtained at the end of the alkali treatment has a concentration of silver of at least 2000 ppm. The residue so obtained at the end of the alkali treatment is in the range of 2,000 ppm to 3,000 ppm depending on the starting concentration level of silver in Jarosite.

The silver at this concentration level is recoverable and hence to achieve this concentration level is very important from commercial point of view.

In another embodiment, the Jarofix which is a solidified version of jarosite to keep it from flying as a dust, is also subjected to the method for recovery of metals as well as cement for its effective utilization according to method of the present invention.

In the present invention, the treatment of nitric acid to jarosite waste extracts lead nitrate, cadmium nitrate, iron nitrate, copper nitrate, nickel nitrate, zinc nitrate, aluminum nitrate, manganese nitrate, cobalt nitrate, magnesium nitrate and calcium nitrate in the filtrate; the treatment of sulfuric acid to the residue obtained from step (a) extracts the metal in the form of ferrous sulfate, aluminum sulfate, zinc sulfate and calcium sulfate in the filtrate; and the treatment of alkali to the residue obtained from step (a) extracts the metal in the form of sodium silicate and sodium aluminate in the filtrate. It is important to note that silver is present in the Jarosite waste/Jarofix waste as sulfate or silicate and the same is not extracted in nitric acid as well as sulfuric acid or alkali. Thus, silver gets enriched in the insoluble residue in the method for recovery of metals from Jarosite waste for its effective utilization.

By giving treatment of nitric acid and sulfuric acid or alkali, most of the metals in the form of sulfates and nitrates are extracted from the Jarosite or Jarofix and the remaining insoluble residue is enriched with silver concentration. It is found that the concentration of silver is of at least 2000 ppm, where silver can be easily recoverable and the residue has good commercial value.

Thus, the present invention recovers every valuable element to the fullest and thus utilizing the Jarosite or Jarofix waste effectively. The invention also recovers every resource that is added to the recovery process to its full value.

The above invention can be illustrated with the below mentioned examples but not by way of limitations. In other word, exemplary illustrations of the operation of the present invention, the practice of its formulation and the rendering of the disclosed process are described in the following examples. In addition to the preferred modes of operation, a practitioner of sufficient skill in the art will appreciate that the meets and bounds of the present invention are not limited by the specific instances described herein, rather are defined by the equivalents provided by the claims of the present invention.

Example 1 a) Treatment with Nitric Acid 250 gm of Jarosite sample was extracted from Jarosite waste by Coning and Quartering Sampling method and taken into the mixer with agitator. To this, 400 gm of 69% nitric acid was added. The mixture was ground/milled for 2.5 minutes in the dispersion mill in the presence of 80% wt./wt. of $ZrO_2$ beads. The mixture was filtered under vacuum by using filter paper to obtain a filtrate comprising lead nitrate, cadmium nitrate, iron nitrate, copper nitrate, nickel nitrate, zinc nitrate, aluminum nitrate, manganese nitrate, cobalt nitrate, magnesium nitrate and calcium nitrate and a residue consisting of insoluble sulfates of lead, cadmium and silver, ferric oxide, oxides of silicon, oxides of arsenic and compounds of iron, zinc, calcium, aluminum and silica. The residue was washed with water and the washing was combined with filtrate.

Similarly, the residue that remained after 1st treatment with nitric acid was treated thrice with 400 gm of 69% of nitric acid by grinding/milling in the dispersion mill in the presence of 80% wt./wt. of $ZrO_2$ beads for 2.5 minutes followed by filtration and washing the residue with water by following the aforesaid process.

The filtrates and washings so obtained every time were combined to obtain 2600 ml filtrate at end of step (a).

The residue and the filtrate obtained at the end of step (a) was analyzed for its composition by XRF Analysis and by material balance method respectively.

Yield: 50 gm of residue comprising 3.2 gm lead sulfate, 0.2 gm cadmium sulfate and 0.170 gm silver oxide as sulfate, 10.13 gm ferric oxide, 30.1 gm oxides of silicon, 0.01 gm oxides of arsenic and 6.19 gm of compounds of iron, zinc, calcium, aluminum, and silica.

2600 ml of filtrate comprising 11.3 gm lead oxide as lead nitrate, 0.3 gm cadmium nitrate, 71.8 gm iron oxide as nitrate, 0.3 gm copper oxide as copper nitrate, 0.012 gm nickel oxide as nickel nitrate, 0.04 gm manganese oxide as manganese nitrate, 0.15 gm cobalt oxide as cobalt nitrate, 22.3 gm zinc oxide as zinc nitrate, 7.7 gm Al2O3 as aluminum nitrate, 0.02 gm cobalt oxide as nitrate, 2.3 gm magnesium oxide as nitrate and 7.5 gm calcium oxide as calcium nitrate.

b) Treatment with Sulfuric Acid 45 gm of residue obtained from step (a) was mixed with 50 gm of 98% of sulfuric acid. To this, 10 gm of iron scrap was added. The mixture was subjected to reduction by stirring at 55° C. for 60 minutes. An acid insoluble residue comprising compounds of silica, iron, zinc and lead and sulfates of lead, cadmium, calcium and silver was filtered by using filter paper under vacuum and to obtain a filtrate comprising ferrous sulfate, aluminum sulfate, zinc sulfate and calcium sulfate.

The residue and the filtrate obtained at the end of step (b) was analyzed for its composition by XRF Analysis and by material balance method respectively.

Yield: 36.6 gm of residue consisting of 71.95% compounds of silica, iron, zinc, and lead, 17.95% lead sulfate, 8.7% cadmium sulfate, 1.0043% calcium sulfate, and 0.3957% silver sulfate where silver concentration was 2100 ppm.

500 ml filtrate including washings consisting of 7.32% ferrous sulfate, 0.01% aluminum sulfate, 0.26% zinc sulfate, and 0.01% calcium sulfate.

c) Neutralization 500 ml of filtrate obtained from step (b) was mixed with 2600 ml filtrate obtained from step (a) to obtain 3100 ml of combined filtrate. To the combined filtrate, ammonia was added to adjust pH of the filtrate to 8 to precipitate iron and aluminum simultaneously as hydroxides. The precipitated iron hydroxide and aluminum hydroxide was filtered along with lead sulfate, cadmium sulfate and calcium sulfate. The filtrate consisted of zinc, copper, calcium, magnesium, manganese, cobalt and nickel. The precipitate was further washed with 100 ml of water to recover all zinc, copper, calcium, magnesium, manganese, cobalt and nickel residues remained in the precipitate.

The residue and the filtrate obtained at the end of step (c) was analyzed for its composition by XRF Analysis and by material balance method respectively.

Yield: 200 gm of residue consisting of 157.1 gm Fe2O3, 7.7 gm Al2O3, 16.9 gm lead sulfate, 0.1 gm cadmium sulfate and 18.2 gm calcium sulfate.

4000 ml of filtrate comprising sulfates or nitrates of 22.3 gm zinc oxide, 0.3 gm copper oxide, 7.5 gm calcium oxide, 3.2 gm magnesium oxide, 30 mg cobalt, 50 mg manganese oxide and 20 mg nickel oxide.

d) Reduction 102 gm of precipitate was reduced at 1000° C. for 80 minutes in reducing atmosphere comprising carbon monoxide and hydrogen to produce elemental lead and cadmium.

Yield: 13.5 gm of 97% lead and 3% cadmium.

e) Elemental Displacement 4000 ml filtrate obtained from step (c) was analyzed by atomic absorption and it was found that total concentration of cobalt, manganese, nickel and copper in the filtrate was 0.037 mole. Two moles of elemental zinc was added to displace each mole of cobalt, nickel and copper. 10 gm of zinc metal powder was added to the filtrate to displace all the four elements. The mixture was stirred for 60 minutes to displace the metals. The displaced metals were filtered off to obtain metals and a residual solution. The concentration of cobalt, manganese, nickel and copper in the residual solution was analyzed by atomic absorption and it was found to be below 1 ppm. This represented more than 99% recovery of cobalt, manganese, nickel and copper.

Yield: 2.2 gm of metal comprising 60% copper; 12% cobalt; 14% manganese, 14% nickel; and 4000 ml of residual solution comprising nitrates or sulfates of 22.3 gm zinc as zinc nitrate or sulfate, 7.5 gm calcium oxide as sulfate and 3.2 gm magnesium oxide as magnesium sulfate.

f) Concentration of Residual Solution 4000 ml of residual solution from step (e) was concentrated by heating at 100° C. to yield a mixture of zinc nitrate, zinc sulfate, calcium ammonium nitrate and magnesium nitrate.

Yield: 1170 gm of the mixture comprising of 22.3 gm zinc oxide as zinc nitrate or sulfate, 7.5 gm calcium oxide as calcium ammonium nitrate and 3.2 gm magnesium oxide as magnesium nitrate and 1,137 gm ammonium nitrate.

Example 2 a) Treatment with Nitric Acid 250 gm of Jarosite sample was extracted from Jarosite waste by Coning and Quartering Sampling method and taken into the mixer with agitator. To this, 400 gm of 69% nitric acid was added. The mixture was ground/milled for 2.5 minutes in the dispersion mill in the presence of 80% wt./wt. of $ZrO_2$ beads. The mixture was filtered under vacuum by using filter paper to obtain a filtrate comprising lead nitrate, cadmium nitrate, iron nitrate, copper nitrate, nickel nitrate, zinc nitrate, aluminum nitrate, manganese nitrate, cobalt nitrate, magnesium nitrate and calcium nitrate and a residue consisting of insoluble sulfates of lead, cadmium and silver, ferric oxide, oxides of silicon, oxides of arsenic and compounds of iron, zinc, calcium, aluminum and silica. The residue was washed with water and the washing was combined with filtrate.

Similarly, the residue that remained after 1st treatment with nitric acid was treated thrice with 400 gm of 69% of nitric acid by grinding/milling in the dispersion mill in the presence of 80% wt./wt. of $ZrO_2$ beads for 2.5 minutes followed by filtration and washing the residue with water by following the aforesaid process.

The filtrates and washings so obtained every time were combined to obtain 2600 ml filtrate at end of step (a).

The residue and the filtrate obtained at the end of step (a) was analyzed for its composition by XRF Analysis and by material balance method respectively.

Yield: 50 gm of residue comprising 3.2 gm lead sulfate, 0.2 gm cadmium sulfate and 0.17 gm silver oxide as sulfate, 10.13 gm ferric oxide, 30.1 gm oxides of silicon, 0.01 gm oxides of arsenic and 6.19 gm of compounds of iron, zinc, calcium, aluminum, and silica.

2600 ml of filtrate comprising 11.3 gm lead oxide as lead nitrate, 0.3 gm cadmium nitrate, 71.8 gm iron oxide as nitrate, 0.3 gm copper oxide as copper nitrate, 0.012 gm nickel oxide as nickel nitrate, 0.04 gm manganese oxide as manganese nitrate, 0.15 gm cobalt oxide as cobalt nitrate, 22.3 gm zinc oxide as zinc nitrate, 7.7 gm Al2O3 as aluminum nitrate, 0.02 gm cobalt oxide as nitrate, 2.3 gm magnesium oxide as nitrate and 7.5 gm calcium oxide as calcium nitrate.

b) Treatment with Alkali 45 gm of the residue obtained from step (a) was mixed with 25 gm of sodium hydroxide and 100 ml of water. The mixture was heated at 180° C. under autogenous pressure (pressure decided by phase rule) for 60 minutes. Upon cooling, the reaction mixture was filtered to obtain a residue comprising sulfates of lead, cadmium and silver, and compounds of iron, alumina, zinc, and silica and a filtrate comprising sodium silicate, sodium aluminate and un-reacted alkali. The residue was washed with water and the washing was combined with filtrate (total filtrate=150 ml).

150 ml filtrate was subjected to crystallization. To this filtrate, 5 gm of zeolite clay as seeds were added and kept for 24 hrs at 100° C. to crystallize aluminosilicate. The mixture was filtered and washed with de-mineralized water. The filtrate primarily comprising sodium hydroxide was recycled in the next batch of step (b)

The residue and the filtrate obtained at the end of step (b) was analyzed for its composition by XRF Analysis and by material balance method respectively.

Yield: 24.894 gm of residue consisting of 1.2 gm lead oxide as lead sulfate, 0.004 gm cadmium oxide as cadmium sulfate and 0.17 gm silver oxide as silver sulfate, and 23.52 gm of compounds of iron, alumina, zinc, and silica where silver concentration was 2650 ppm; 15 gm of alumino silicate; 260 ml containing 80% of sodium hydroxide.

c) Neutralization

To 2600 ml filtrate obtained from step (a), ammonia was added to adjust pH of the filtrate to 8 to precipitate iron and aluminum simultaneously as hydroxides. The precipitated iron hydroxide and aluminum hydroxide was filtered along with lead sulfate, cadmium sulfate and calcium sulfate. The filtrate consisted of zinc, copper, calcium, magnesium, manganese, cobalt and nickel. The precipitate was further washed with 100 ml of water to recover all zinc, copper, calcium, magnesium, manganese, cobalt and nickel residues remained in the precipitate. The washings were combined with the filtrate to process further in the step (e).

The residue and the filtrate obtained at the end of step (c) was analyzed for its composition by XRF Analysis and by material balance method respectively.

Yield: 135 gm of residue consisting 80.55% iron hydroxide, 5.5% aluminum hydroxide, 8.3% lead sulfate, 0.1% cadmium sulfate and 5.55% calcium sulfate; and 3500 ml of filtrate comprising 0.63% zinc, 0.0085% copper, 0.088% calcium, 0.037% magnesium, 0.002% manganese, 0.001% cobalt and 0.0012% nickel.

d) Reduction 135 gm of precipitate was reduced at 1000° C. for 80 minutes in reducing atmosphere comprising carbon monoxide and hydrogen to produce elemental lead and cadmium.

Yield: 14.5 gm of 97% lead and 3% cadmium.

e) Elemental Displacement 4000 ml filtrate obtained in step (c) was analyzed by atomic absorption and it was found that total concentration of manganese, cobalt, nickel, and copper in the filtrate was 0.03 mole. Two moles of elemental zinc was added to displace each mole of manganese, cobalt, nickel and copper. 10 gm of zinc metal powder was added to the filtrate to displace all the three elements. The mixture was stirred for 60 minutes to displace the metals. The displaced metals were filtered off to obtain metals and a residual solution. The concentration of manganese, cobalt, nickel and copper in the residual solution was analyzed by atomic absorption and it was found to be below 1 ppm. This represented more than 99% recovery of manganese, cobalt, nickel and copper.

Yield: 2.2 gm of metal comprising 60% copper; 14% cobalt; 10% manganese; 16% nickel; and 4000 ml of residual solution comprising nitrates or sulfates of 22.3 gm zinc as zinc nitrate or sulfate, 7.5 gm calcium oxide as sulfate and 3.2 g magnesium oxide as magnesium sulfate.

f) Concentration of Residual Solution:

4000 ml of residual solution from step (e) was concentrated by heating at 100° C. to yield a mixture of zinc nitrate, zinc sulfate, calcium ammonium nitrate and magnesium nitrate.

Yield: 1170 gm of the mixture comprising of 22.3 gm zinc oxide as zinc nitrate or sulfate, 7.5 gm calcium oxide as calcium ammonium nitrate and 3.2 gm magnesium oxide as magnesium nitrate and 1,137 gm ammonium nitrate.

Thus, the present invention recovers every valuable element to the fullest and thus utilizing the Jarosite or Jarofix waste effectively.

The invention claimed is:

1. A method for recovery of metals from Jarosite waste for its effective utilization wherein, the method comprises:
  (a) treating the Jarosite waste by mixing the Jarosite waste with 69% nitric acid in 1:1.5 to 2 proportion followed by grinding 20% wt./wt. of the mixture in the presence of 80% wt./wt. ZrO2 beads for at least 2.5 minutes in a grinding machine and further filtering the treated waste by using filter paper under vacuum to obtain a filtrate consisting of lead nitrate, cadmium nitrate, iron nitrate, copper nitrate, nickel nitrate, zinc nitrate, aluminum nitrate, manganese nitrate, cobalt nitrate, magnesium nitrate, and calcium nitrate and an insoluble residue consisting of sulfates of lead, cadmium, and silver, oxides of arsenic, and compounds of iron, zinc, calcium, aluminum, and silica;
(b) treating the residue obtained in step (a) with sulfuric acid in the presence of a reducing agent followed by filtration to obtain an acid insoluble residue consisting of compounds of silica, iron, and zinc, sulfates of lead, cadmium, calcium, and silver, and a filtrate consisting of ferrous sulfate, aluminum sulfate, zinc sulfate, and calcium sulfate;
(c) combining the filtrate obtained from steps (a) and (b) followed by adding ammonia to the combined filtrate followed by filtration to obtain an insoluble residue consisting of iron hydroxide, aluminum hydroxide, lead sulfate, cadmium sulfate, and calcium sulfate and a filtrate consisting of sulfates or nitrates of zinc, copper, calcium, magnesium, manganese, cobalt, and nickel;
(d) reducing the residue obtained in step (c) at 800-1100° C. under reducing atmosphere to produce an elemental lead and cadmium;
(e) adding elemental zinc metal powder to the filtrate from step (c) to galvanically displace metals followed by filtration to recover elemental copper, manganese, cobalt, and nickel and a residual solution followed by analyzing the residual solution for the absence of copper, manganese, cobalt, and nickel; and
(f) concentrating the residual solution obtained in step (e) to obtain a mixture of zinc nitrate, zinc sulfate, calcium ammonium nitrate, magnesium nitrate, and ammonium nitrate to be used as fertilizer.

2. The method as claimed in claim 1, wherein the step (a) is repeated at least three times on a residue remaining after the treating of step (a) before executing any step (b)-(f).

3. The method as claimed in claim 1, wherein the step (a) is carried out in multiple dispersion mills.

4. The method as claimed in claim 1, wherein the filtrate obtained from step (a) is optionally treated with ammonium sulfate to precipitate lead nitrate and cadmium nitrate as lead sulfate and cadmium sulfate respectively followed by filtration to obtain lead sulfate and cadmium sulfate.

5. The method as claimed in claim 4, wherein the amount of ammonium sulfate added is equivalent to the amount of lead and cadmium nitrate present in the filtrate obtained in step (a).

6. The method as claimed in claim 1, wherein the step (b) is treating the residue obtained from step (a) with 98% of sulfuric acid in 0.9:1 proportion in the presence of 20% wt./wt. of the reducing agent by stirring followed by filtration to obtain the acid insoluble residue comprising compounds of silica, iron, zinc and lead and sulfates of lead, cadmium, calcium and silver; and the filtrate comprising ferrous sulfate, aluminum sulfate, zinc sulfate and calcium sulfate.

7. The method as claimed in claim 1, wherein the step (c) is carried out by combining the filtrate obtained from steps (a) and (b) followed by adding ammonia to the combined filtrate to adjust its pH to 8 followed by filtration to obtain the residue consisting of iron hydroxide, aluminum hydroxide, lead sulfate, cadmium sulfate and calcium sulfate and the filtrate consisting of sulfates or nitrates of zinc, copper, calcium, magnesium, manganese, cobalt and nickel.

8. The method as claimed in claim 1, wherein the step (d) is carried out by reducing the residue obtained in step (c) in the presence of gaseous reducing agents such as carbon monoxide and hydrogen at 800-1100° C. to produce the elemental lead and cadmium.

9. The method as claimed in claim 1, wherein the step (e) of metal displacement is carried out by analyzing the concentration of copper, manganese, cobalt and nickel in the filtrate obtained from step (c), adding 200% of stoichiometric excess concentration of the elemental zinc metal based on total combined metals of copper, manganese, cobalt and nickel to the filtrate followed by stirring to displace metals like copper, manganese, cobalt and nickel by galvanic displacement followed by filtration to obtain the metals like copper, manganese, cobalt and nickel and the residual solution consisting of nitrates or sulfates of zinc, calcium and magnesium.

10. The methods as claimed in claim 1, wherein the step (f) is carried out by concentrating the residual solution of step (e) by heating at 50° C. to 100° C. to obtain the mixture of zinc nitrate, zinc sulfate, calcium ammonium nitrate, magnesium nitrate and ammonium nitrate.

11. The method as claimed in claim 1, wherein the step (b) is carried out by treating the residue obtained from step (a) with alkali at 120° C. to 180° C. under autogenous pressure followed by cooling and filtration to obtain a residue comprising insoluble sulfates of lead, cadmium and silver, and compounds of iron, alumina, zinc, and silica and a filtrate comprising sodium silicate, sodium aluminate and alkali.

12. The method as claimed in claim 11, wherein the filtrate is subjected to crystallization by adding seeds of zeolite clay to crystallize alumino silicates followed by filtration to obtain crystals of alumino silicates and a filtrate comprising alkali and recycling the filtrate in the next batch for alkali treatment of step (b).

13. The method as claimed in claim 1, wherein the residue obtained in step (b) has a concentration of silver of at least 2000 ppm.

* * * * *